US012272902B2

(12) United States Patent
Uchiyama

(10) Patent No.: US 12,272,902 B2
(45) Date of Patent: Apr. 8, 2025

(54) TERMINAL MODULE AND CONNECTOR

(71) Applicant: SUMITOMO WIRING SYSTEMS, LTD., Mie (JP)

(72) Inventor: Takayuki Uchiyama, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 364 days.

(21) Appl. No.: 17/831,792

(22) Filed: Jun. 3, 2022

(65) Prior Publication Data

US 2022/0393395 A1 Dec. 8, 2022

(30) Foreign Application Priority Data

Jun. 8, 2021 (JP) ................................ 2021-095566

(51) Int. Cl.

| | |
|---|---|
| ***H01R 13/24*** | (2006.01) |
| ***H01R 13/15*** | (2006.01) |
| ***H01R 13/502*** | (2006.01) |
| ***H01R 13/629*** | (2006.01) |
| *H01R 4/18* | (2006.01) |

(52) U.S. Cl.

CPC ........... *H01R 13/629* (2013.01); *H01R 13/15* (2013.01); *H01R 13/24* (2013.01); *H01R 13/502* (2013.01); *H01R 4/18* (2013.01)

(58) Field of Classification Search

CPC ...... H01R 13/629; H01R 13/15; H01R 13/24; H01R 13/502; H01R 4/18; H01R 13/187; H01R 4/4863

See application file for complete search history.

(56) References Cited

U.S. PATENT DOCUMENTS

2019/0013609 A1* 1/2019 Kimura ................. H01R 13/33

FOREIGN PATENT DOCUMENTS

JP 2018-101556 A 6/2018

* cited by examiner

*Primary Examiner* — Abdullah A Riyami
*Assistant Examiner* — Nelson R. Burgos-Guntin
(74) *Attorney, Agent, or Firm* — Venjuris, P.C.

(57) ABSTRACT

A terminal module to be electrically connected to a mating connector by being fit to the mating connector relatively approaching along a first direction from one side to another side is provided with a case having a ceiling wall and a pair of side walls extending toward the one side from the ceiling wall, a resilient member to be accommodated into the case and stretchable along the first direction, a first terminal to be supported on the pair of side walls while being biased toward the one side by the resilient member and movable toward the other side by being pressed by the mating connector, a second terminal located away from the first terminal toward the other side and extending in the first direction, and a flexible conductor for electrically connecting the first terminal and the second terminal.

9 Claims, 12 Drawing Sheets

TERMINAL MODULE AND CONNECTOR

CROSS-REFERENCE TO RELATED APPLICATIONS

This application is based on and claims priority from Japanese Patent Application No. 2021-095566, filed on Jun. 8, 2021, with the Japan Patent Office, the disclosure of which is incorporated herein in its entirety by reference.

TECHNICAL FIELD

The present disclosure relates to a terminal module and a connector.

BACKGROUND

For example, in an automotive vehicle or the like, a technique is known which achieves space saving through the omission of a wiring harness by connecting connectors provided on cases of devices in connecting the devices such as a motor and a PCU (Power Control Unit). For example, Japanese Patent Laid-open Publication No. 2018-101556 discloses a technique for connecting a mating connector on an insertion side to a connector on a reception side.

In Japanese Patent Laid-open Publication No. 2018-101556, the connector includes a coil spring and an electrical contact member provided on the tip of the coil spring. In connecting the connectors, a mating contact point included in the mating connector compresses the coil spring via the electrical contact member. In this way, the electrical contact member is pressed against the mating contact point by the coil spring and the electrical contact member and the mating contact point are electrically connected.

The electrical contact member is electrically connected to an external connecting member by a braided wire. The braided wire is provided to be deflected according to a movement of the electrical contact member. By the deflection of the braided wire, the electrical contact member can move while maintaining electrical connection to the external connecting member when the mating contact point is connected to the electrical contact member.

SUMMARY

As described above, in a connector accompanied by a movement of a member at the time of connection, a flexible conductor such as a braided wire is used to electrically connect a moving part (electrical contact member) and a fixed part (external connecting member). Since the flexible conductor is formed by a relatively soft wire or the like, the flexible conductor may be broken due to rubbing against another member (e.g. a housing) included in the connector. Since it is difficult to perfectly predict how the flexible conductor will be deflected when the connectors are connected, a space with a margin needs to be further provided for a movable range of the flexible conductor, for example, in the housing to prevent wire breakage. As a result, there has been a problem that the connector is enlarged and space saving is not achieved.

In view of such a problem, the present disclosure aims to provide a terminal module capable of miniaturizing a connector while suppressing the breakage of a flexible conductor. The present disclosure also aims to provide a connector capable of being miniaturized while suppressing the breakage of a flexible conductor.

The present disclosure is directed to a terminal module to be electrically connected to a mating connector by being fit to the mating connector relatively approaching along a first direction from one side to another side, the terminal module including a case having a ceiling wall and a pair of side walls extending toward the one side from the ceiling wall, a resilient member to be accommodated into the case, the resilient member being stretchable along the first direction, a first terminal to be supported on the pair of side walls while being biased toward the one side by the resilient member, the first terminal being movable toward the other side by being pressed by the mating connector, a second terminal located away from the first terminal toward the other side, the second terminal extending in the first direction, and a flexible conductor for electrically connecting the first terminal and the second terminal, the flexible conductor including a reformed portion reformed to be contracted in the first direction when the first terminal moves toward the other side.

According to the present disclosure, it is possible to miniaturize a connector while suppressing the breakage of a flexible conductor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
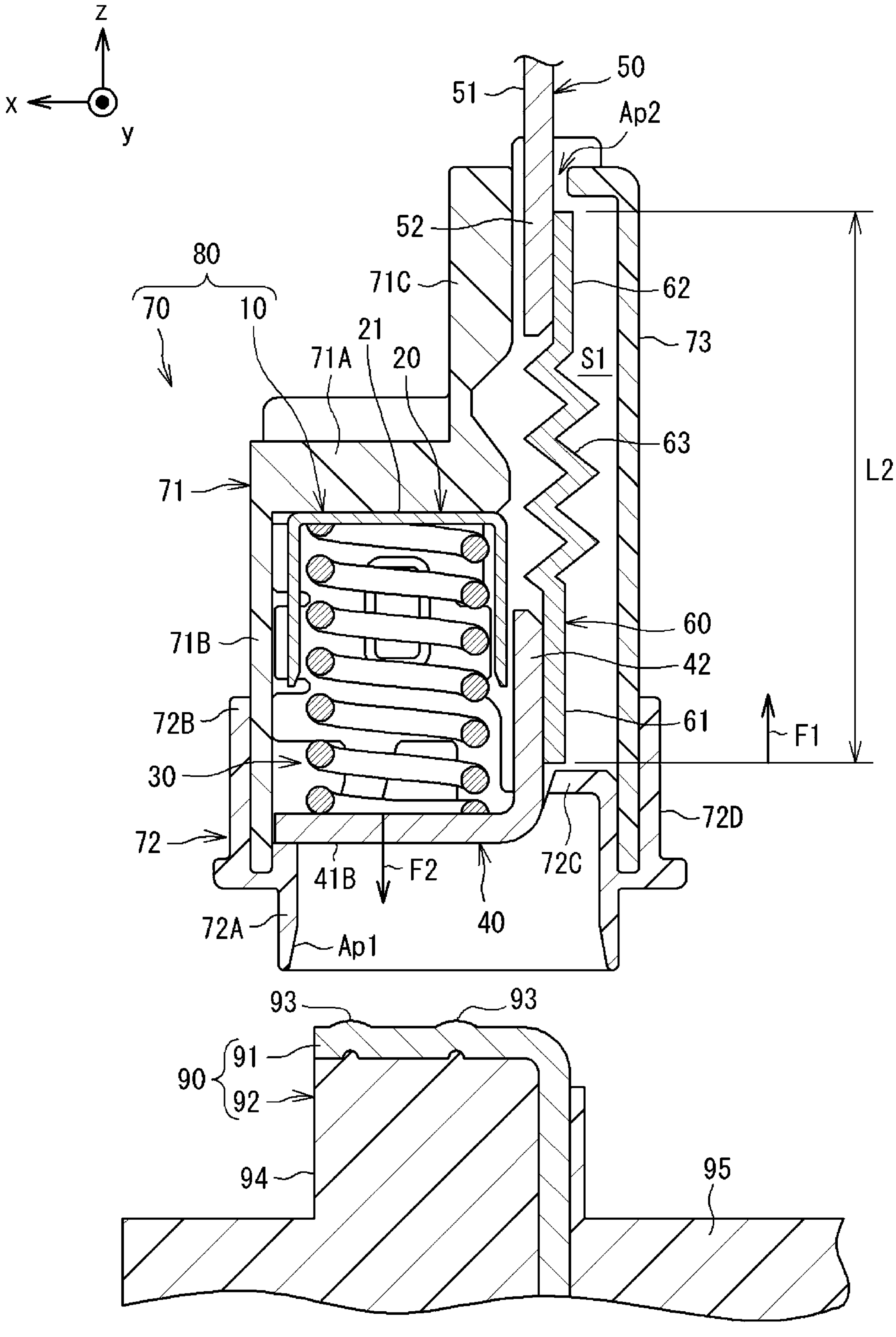
FIG. 1 is a section schematically showing a connector and a mating connector according to an embodiment in an unconnected state.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

Embodiments of the present disclosure include the following configurations as a gist.

(1) The terminal module of the present disclosure is a terminal module to be electrically connected to a mating connector by being fit to the mating connector relatively approaching along a first direction from one side to another side and is provided with a case having a ceiling wall and a pair of side walls extending toward the one side from the ceiling wall, a resilient member to be accommodated into the case, the resilient member being stretchable along the first direction, a first terminal to be supported on the pair of side walls while being biased toward the one side by the resilient member, the first terminal being movable toward the other side by being pressed by the mating connector, a second terminal located away from the first terminal toward the other side, the second terminal extending in the first direction, and a flexible conductor for electrically connecting the first terminal and the second terminal, the flexible conductor including a reformed portion reformed to be contracted in the first direction when the first terminal moves toward the other side.

The reformed portion is reformed to be contracted in the first direction, whereby a movable range of the flexible conductor when the mating connector is connected becomes smaller. Since a space provided inside a connector can be made small in this way, the connector can be miniaturized while the breakage of the flexible conductor is suppressed.

(2) Preferably, the reformed portion is reformed to be deflected toward both sides in a second direction orthogonal to the first direction when the first terminal moves toward the other side. By adopting this configuration, a movable range in the second direction of the flexible conductor when the connector is connected becomes smaller, wherefore the connector can be miniaturized while the breakage of the flexible conductor is suppressed.

(3) Preferably, the reformed portion is reformed into a wavy or spiral shape. By adopting this configuration, the reformed portion can be relatively easily formed.

(4) Preferably, the flexible conductor is a braided wire, a coated wire formed by covering a conductive stranded wire by an insulator, a laminated body formed by laminating a plurality of conductive flat plates or a conductive single wire.

(5) Preferably, a length of the flexible conductor in the first direction is longer than a natural length of the flexible conductor in the first direction in an unconnected state before the terminal module is fit to the mating connector.

By adopting this configuration, a restoring force for returning to the natural length is generated in the flexible conductor in the unconnected state. Since a load in the first direction applied to the flexible conductor at the time of connection can be absorbed by this restoring force, the buckling of the flexible conductor due to an overload can be suppressed. By making the movable range of the flexible conductor even smaller in this way, the connector can be made smaller in size.

(6) Preferably, a length of the resilient member in the first direction is shorter than a natural length of the resilient member in the first direction in the unconnected state, and a resilient force toward the other side generated in the flexible conductor is smaller than a resilient force toward the one side generated in the resilient member in the unconnected state.

A restoring force for returning to the natural length is generated in the flexible conductor in the unconnected state and a force toward the other side is applied to the first terminal. By adopting this configuration, the resilient member presses the first terminal more toward the one side by a larger restoring force, wherefore the first terminal can be held at a predetermined position in the unconnected state.

(7) A connector of the present disclosure is provided with the terminal module of any one of (1) to (6) described above, and a housing for accommodating the terminal module.

Details of Embodiment of Present Disclosure

Hereinafter, an embodiment of the present disclosure is described in detail with reference to the drawings.

<Overall Configuration of Connector>

Figure 2:
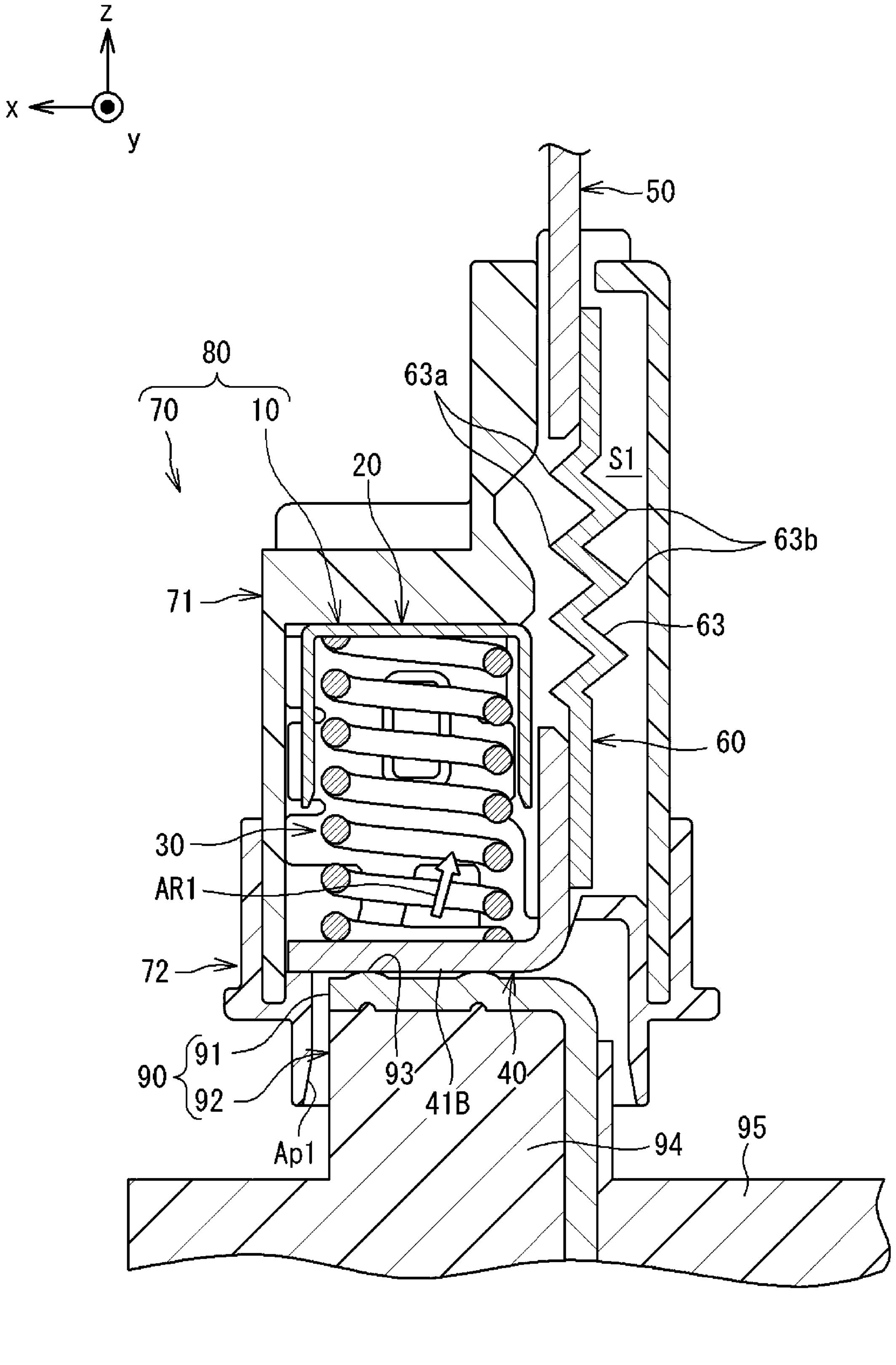
FIG. 2 is a section schematically showing the connector and the mating connector according to the embodiment being connected to each other.
Figure 3:
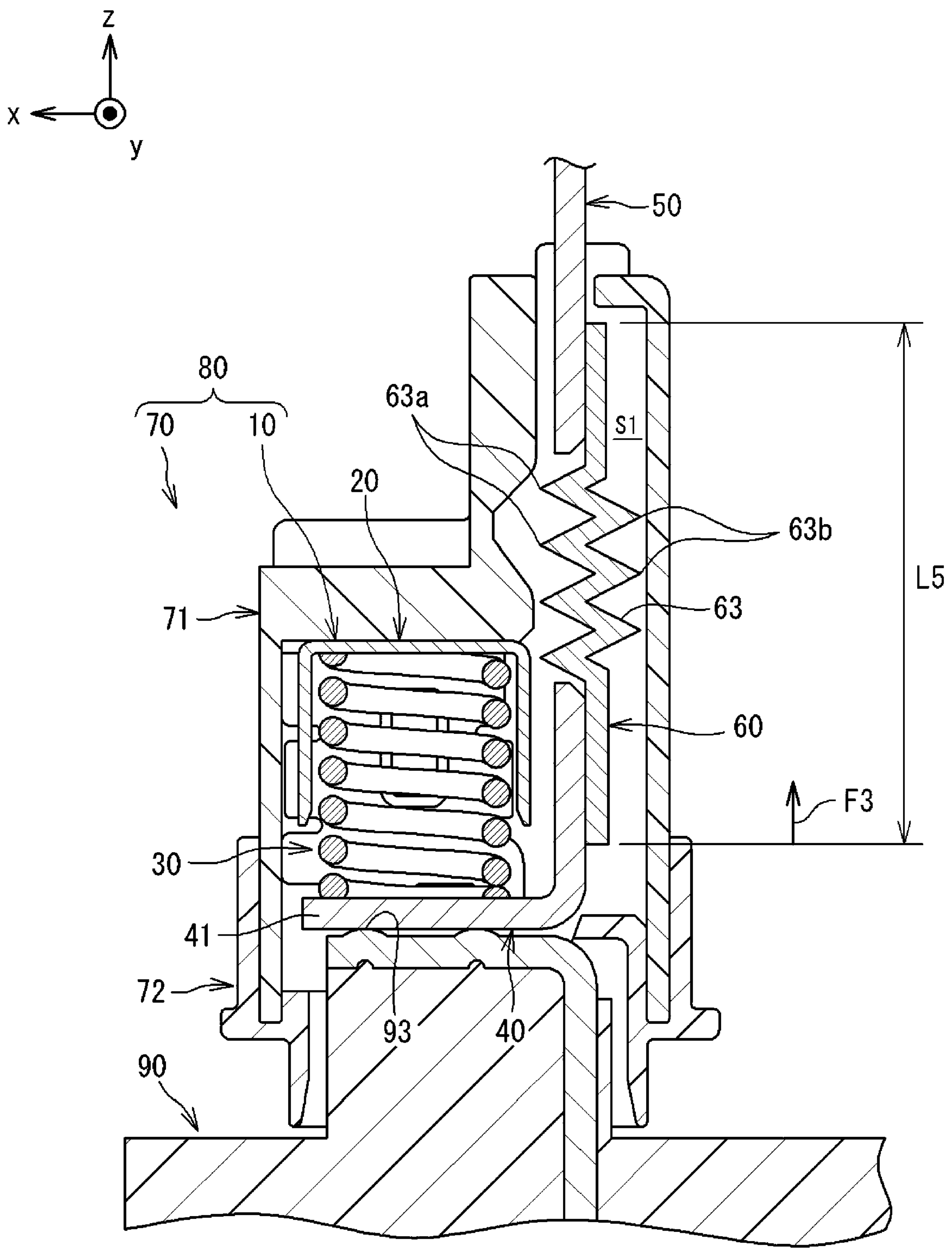
FIG. 3 is a section schematically showing the connector and the mating connector according to the embodiment in a connected state.

FIG. 1 is a section schematically showing a connector 80 and a mating connector 90 according to the embodiment before connection. In the connector 80, a state before connection to the mating connector 90 is referred to as an "unconnected state". FIG. 2 is a section schematically showing the mating connector 80 and the mating connector 90 being connected. FIG. 3 is a section schematically showing the connector 80 and the mating connector 90 after connection. In the connector 80, a state after connection to the mating connector 90 is referred to as a "connected state".

In the following description, an attaching/detaching direction of the mating connector 90 to/from the connector 80 is referred to as a "vertical direction (first direction of the present disclosure)" and shown as a z direction in figures. A side toward which the mating connector 90 is attached to the connector 80 is an "upper side (positive side in the z direction, another side of the present disclosure)". Further, in the connector 80, a direction which is orthogonal to the vertical direction and in which a resilient member 30 is located with respect to a flexible conductor 60 to be described later is referred to as a "front-rear direction (second direction of the present disclosure)" and shown as an x direction in the figures. A side on which the resilient member 30 is located with respect to the flexible conductor 60 is a "front side (positive side in the x direction)". Further, a direction orthogonal to the vertical direction and front-rear direction is referred to as a "lateral direction" and shown as a y direction in the figures. A left side when facing forward is a "left side (positive side in the y direction). Note that the above directions are relative directions used to describe the configuration and the like of the connector 80 and do not mean directions when the connector 80 is actually mounted on a device.

The connector 80 and the mating connector 90 are respectively provided on devices installed in an automotive vehicle. For example, the connector 80 is provided on a PCU (an example of a device) including an inverter circuit, and the mating connector 90 is provided on a motor (an example of a mating device). By inserting the mating connector 90 into the connector 80 as shown in FIG. 3 by way of states shown in FIGS. 1 and 2, the connector 80 and the mating connector 90 are connected and the PCU and the motor are electrically connected. The connection of the connector 80 and the mating connector 90 is described later.

The connector 80 includes a terminal module 10 and a housing 70. Hereinafter, the terminal module 10 is described appropriately with reference to FIGS. 4 to 8 and the housing 70 is described with reference to FIG. 1.

<<Configuration of Terminal Module>>

Figure 4:
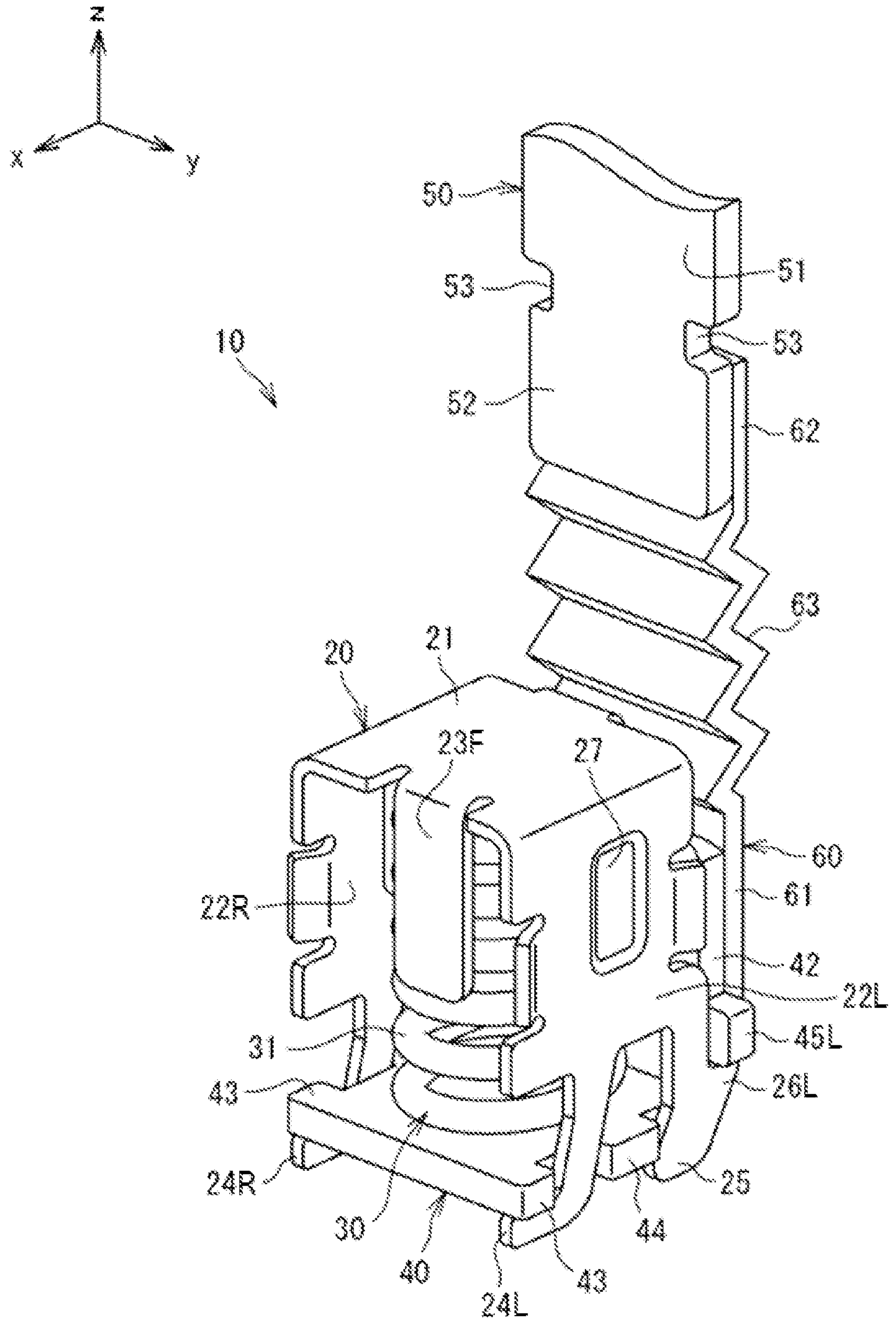
FIG. 4 is a perspective view of a terminal module according to the embodiment when viewed obliquely from a left upper side.
Figure 5:
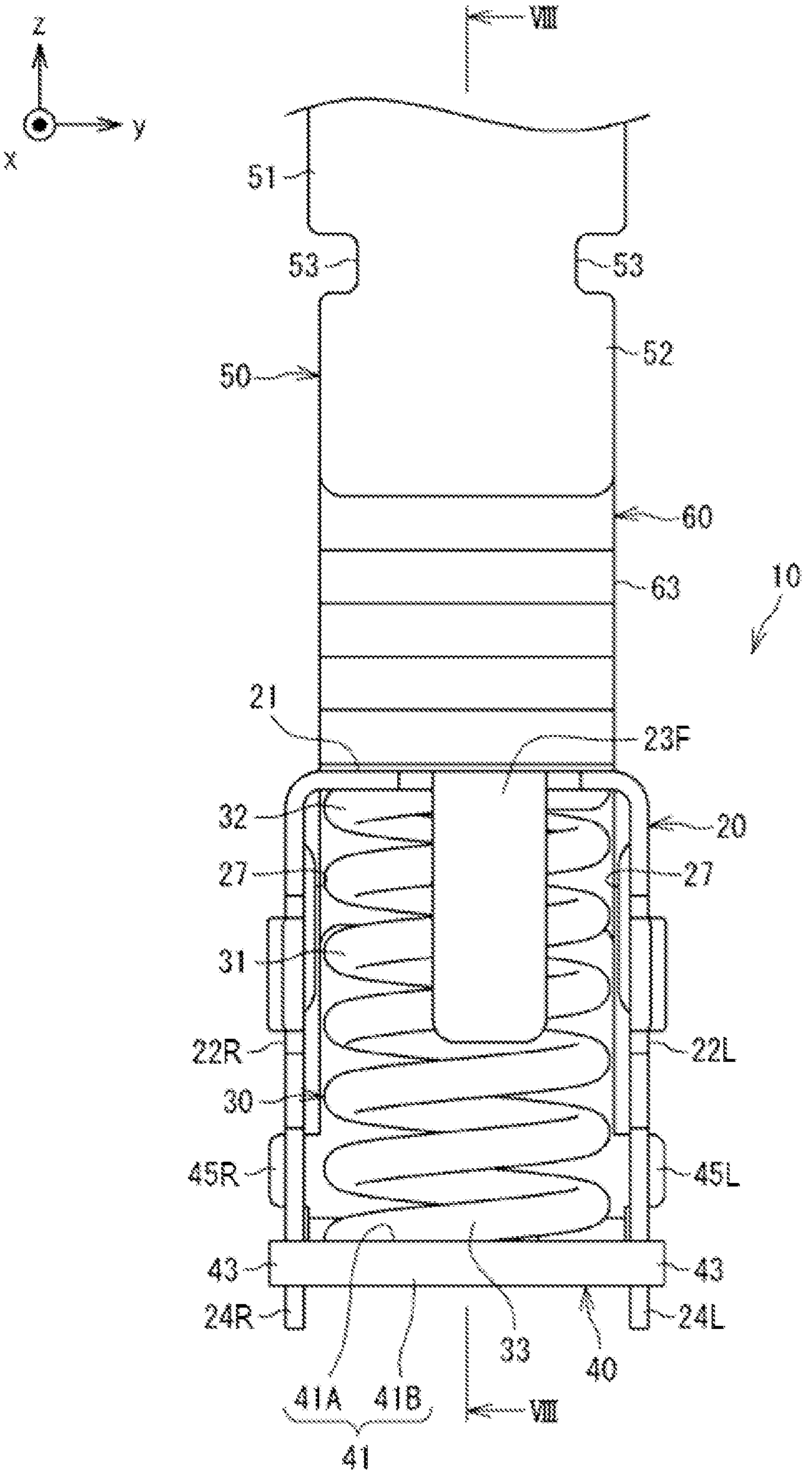
FIG. 5 is a front view of the terminal module of FIG. 4.
Figure 6:
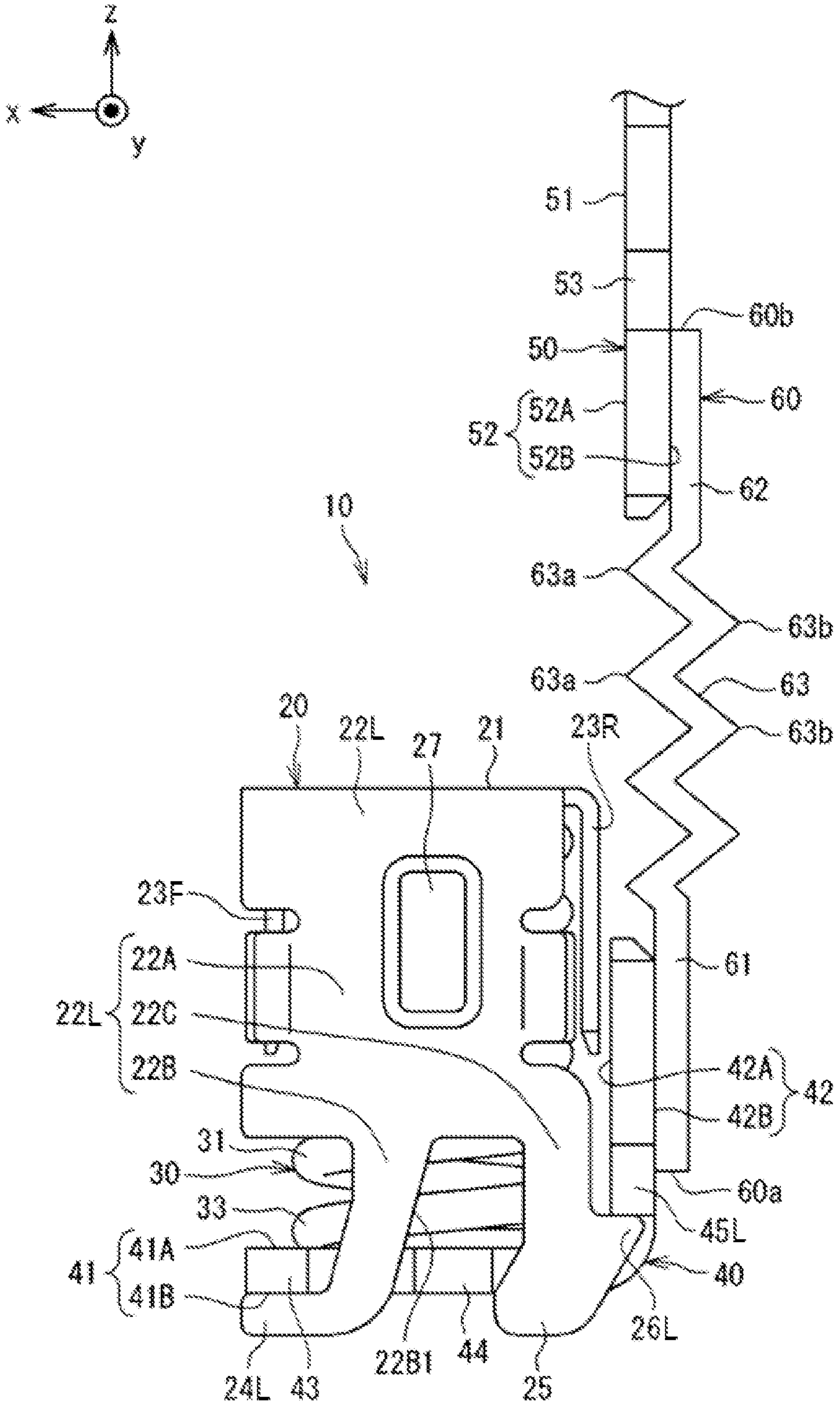
FIG. 6 is a left side view of the terminal module of FIG. 4.
Figure 7:
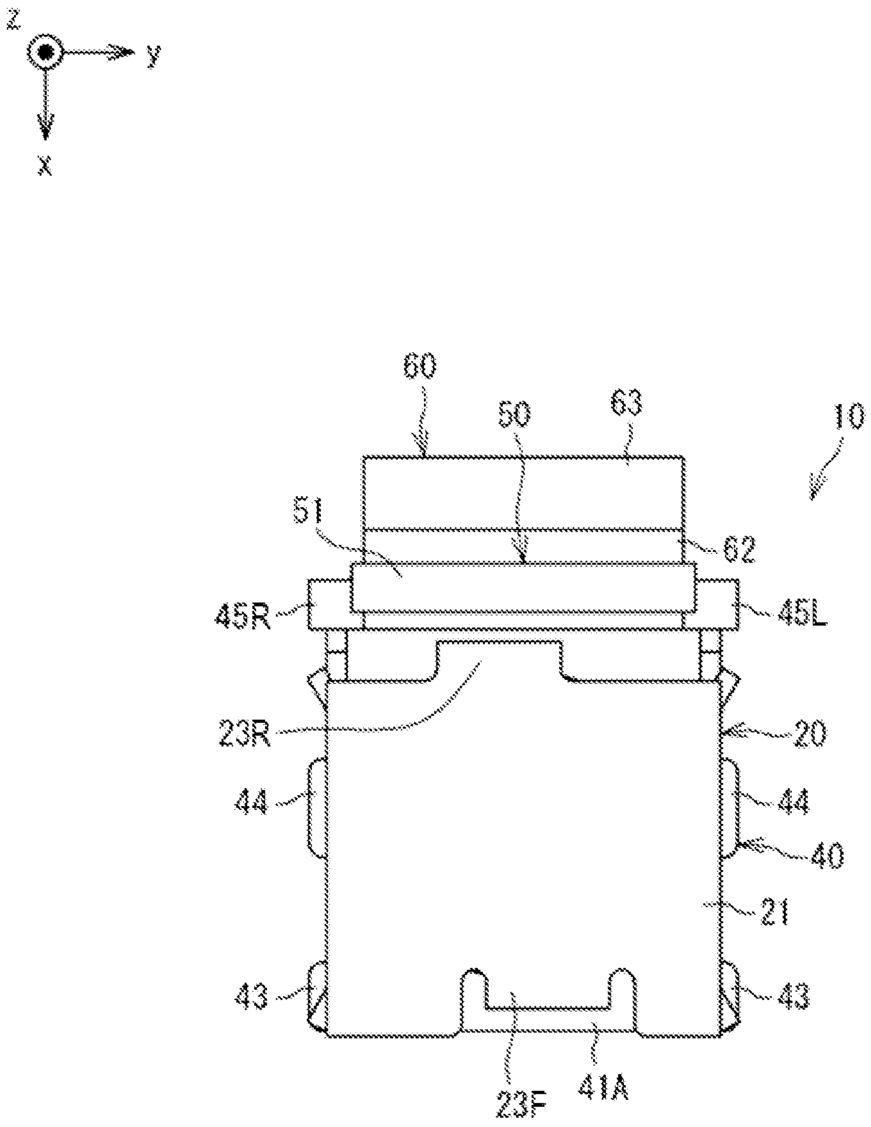
FIG. 7 is a plan view of the terminal module of FIG. 4.
Figure 8:
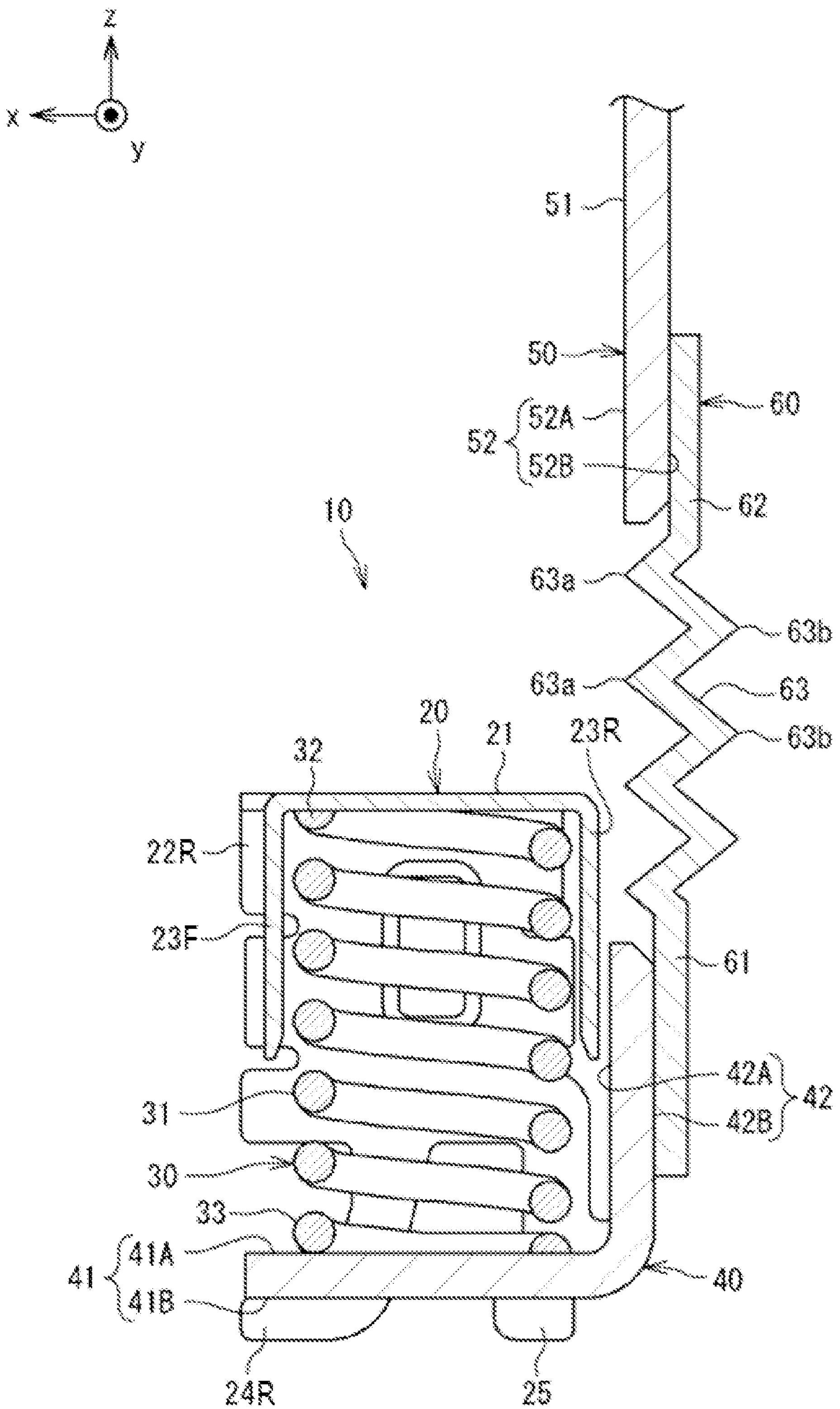
FIG. 8 is a section along VIII-VIII of FIG. 5 of the terminal module.

FIG. 4 is a perspective view of the terminal module 10 according to the embodiment when viewed obliquely from a left upper side. FIG. 5 is a front view of the terminal module 10. FIG. 6 is a left side view of the terminal module 10. FIG. 7 is a plan view of the terminal module 10. FIG. 8 is a section along VIII-VIII of FIG. 5 of the terminal module 10. Here, FIGS. 1, 2 and 3 show the connector 80 and the mating connector 90 in the same cross-section as in FIG. 8.

The terminal module 10 is a module for electrically connecting a mating terminal 91 (FIG. 1) included in the mating connector 90 and an electrical circuit (not shown) included in the device. The terminal module 10 includes a case 20, a resilient member 30, a first terminal 40, a second terminal 50 and the flexible conductor 60. Each component of the terminal module 10 described below is a component in the connector 80 in the unconnected state (i.e. a state of FIG. 1).

The case 20 has a ceiling wall 21, a pair of left and right side walls 22L, 22R and a pair of front and rear side walls 23F, 23R. The case 20 is made of metal (e.g. stainless steel) and the ceiling wall 21, the side walls 22L, 22R and the side walls 23F, 23R are integrally formed by press-working a plate material. The ceiling wall 21 is a region in the form of a flat plate provided along the front-rear direction and lateral direction. Widths in the front-rear direction and lateral direction of the ceiling wall 21 are larger than those of the resilient member 30, and the entire resilient member 30 is covered by the ceiling wall 21 when viewed from above as shown in FIG. 7.

The pair of side walls 22L, 22R are a pair of walls extending downward from lateral edges of the ceiling wall 21 and parallel to each other. Since the pair of side walls 22L, 22R are mirror-symmetrically shaped, the left side wall 22L is representatively described below. As shown in FIG. 6, the left side wall 22L includes a base portion 22A, a first leg portion 22B and a second leg portion 22C.

The base portion 22A is a region continuous with the ceiling wall 21. The base portion 22A has the same width as the ceiling wall 21 in the front-rear direction. The base portion 22A includes a projection 27 projecting rightward (i.e. laterally inward). A lateral inner surface of the projection 27 is facing a lateral side part of the resilient member 30 across a tiny gap as shown in FIG. 5. The projection 27 functions to receive the resilient member 30 bent in the lateral direction when the resilient member 30 is compressed or extended.

The first leg portion 22B is a region inclined forward while extending downward from the base portion 22A in a central part in the front-rear direction of the base portion 22A. An inclination width in the front-rear direction of the first leg portion 22B is longer than a width in the vertical direction thereof. The first leg portion 22B has a smaller width (specifically, about ¼ of that of the base portion 22A) than the base portion 22A in the front-rear direction.

The rear surface of the first leg portion 22B functions as a guide surface 22B1 for guiding a later-described guided portion 44 in connecting the mating connector 90. Since the guide surface 22B1 extends downward while being inclined with respect to the front-rear direction, the guided portion 44 is guided in the vertical direction and also guided in the front-rear direction along the guide surface 22B1. The first leg portion 22B includes a first receiving portion 24 extending forward in a lower end part. The upper surface of the first receiving portion 24 is a surface extending along the front-rear direction and can receive a later-described first engaging portion 43 included in the first terminal 40.

The second leg portion 22C is a region extending downward from the base portion 22A below and behind the base portion 22A. The second leg portion 22C is located behind the first leg portion 22B and separated from the first leg portion 22B in the front-rear direction. The later-described guided portion 44 included in the first terminal 40 is inserted between the first and second leg portions 22B, 22C. The second leg portion 22C has a smaller width (specifically, about ¼ of that of the base portion 22A) than the base portion 22A in the front-rear direction. The second leg portion 22C includes a lower end portion 25 and a second receiving portion 26 projecting rearward above the lower end portion 25. The upper surface of the second receiving portion 26 is a surface extending along the front-rear direction and can receive a later-described second engaging portion 45 included in the first terminal 40.

The pair of side walls 23, 23 are a pair of walls extending downward from front and rear edges of the ceiling wall 21 and parallel to each other. The pair of side walls 23, 23 have a smaller width (specifically, about ⅓ of that of the ceiling wall 21) than the ceiling wall 21 in the lateral direction. Further, the pair of side walls 23, 23 have a smaller width (specifically, about ½ of that of the side wall 22) than the side wall 22 in the vertical direction. Front and rear inner surfaces of the pair of side walls 23, 23 are facing front and rear side parts of the resilient member 30 across a tiny gap as shown in FIG. 8. The pair of side walls 23, 23 function to receive the resilient member 30 bent in the front-rear direction when the resilient member 30 is compressed or extended.

The resilient member 30 is a coil spring formed by winding a wire material made of metal (e.g. stainless steel) into a coil. Note that any member other than the coil spring may be used as the resilient member 30 if this member can be stretched in the vertical direction and inclined with respect to the front-rear direction. For example, the resilient member 30 may be another spring member (e.g. a leaf spring) or a rubber member.

The resilient member 30 is accommodated in the case 20. That is, the resilient member 30 is accommodated in a space surrounded by the ceiling wall 21, the pair of side walls 22, 22 and the pair of side walls 23, 23 and open on a lower side. The resilient member 30 is sandwiched while being compressed in the vertical direction by the ceiling wall 21 and a later-described first section 41 included in the first terminal 40. In this state, the resilient member 30 can be further compressed in the vertical direction. That is, the resilient member 30 is compressed in a length range shorter than a spring natural length and longer than a solid length by the ceiling wall 21 and the first section 41.

As shown in FIG. 8, the resilient member 30 includes a body portion 31, an upper end portion 32 and a lower end portion 33. The upper end portion 32 is a region, which is about one coil from the upper end of the resilient member 30, and in contact with the ceiling wall 21. The lower end portion 33 is a region, which is about one coil from the lower end of the resilient member 30, and is contact with the first section 41. The body portion 31 is a region located between the upper end portion 32 and the lower end portion 33.

The first terminal 40 is a terminal which can physically contact the mating terminal 91, and is attached to the pair of side walls 22, 22. The first terminal 40 includes the first section 41 and a second section 42. The first terminal 40 is made of metal (e.g. copper alloy), and the first section 41 and the second section 42 are integrally formed by press-working a plate material. The first section 41 is provided in parallel to the ceiling wall 21 (i.e. along the front-rear direction and lateral direction) in a state separated downward from the ceiling wall 21. The second section 42 is a region extending upward from the rear edge of the first section 41. Thus, the first terminal 40 is L-shaped in a side view as shown in FIG. 6 (or in a side cross-section as shown in FIG. 8).

An upper surface 41A of the first section 41 functions as a receiving surface for receiving the lower end portion 33 of the resilient member 30. A lower surface 41B of the first section 41 functions as a contact surface capable of contacting mating contact points 93 included in the mating terminal 91.

As shown in FIGS. 4 and 7, the first section 41 includes a pair of left and right first engaging portions 43, 43 and a pair of left and right guided portions 44, 44. The first engaging portion 43 is a region projecting laterally outward on the front edge of the first section 41 and comes into contact with the first receiving portion 24 of the first leg portion 22B in the vertical direction. The guided portion 44 is a region projecting laterally outward in a central part in the front-rear direction of the first section 41, and is inserted into a gap between the first and second leg portions 22B, 22C.

As shown in FIGS. 6 and 8, a front surface 42A of the second section 42 is a surface facing the resilient member 30, and is facing the rear side wall 23R across a tiny gap in the front-rear direction. A rear surface 42B of the second section 42 is a surface facing a side opposite to the resilient member 30. As shown in FIGS. 4 and 5, the second section 42 includes a pair of left and right second engaging portions 45L, 45R. The second engaging portion 45R is a region projecting laterally outward on a side somewhat lower than a vertically central part of the second section 42 and comes into contact with the second receiving portion 26L, 26R of the second leg portion 22C in the vertical direction.

The first terminal 40 is biased downward by the resilient member 30. By the contact of the first engaging portions 43 with the first receiving portions 24L, 24R and by the contact of the second engaging portions 45L, 45R with the second receiving portions 26L, 26R, a downward movement of the first terminal 40 is restricted. That is, in the unconnected state, the first terminal 40 is sandwiched by the resilient member 30 and the pair of side walls 22L, 22R (specifically by the pair of first receiving portions 24L, 24R and the pair of second receiving portions 26L, 26R).

The second terminal 50 is a terminal in the form of a flat plate electrically connected to an electrical circuit (not shown) included in the PCU and is mounted in the housing 70 to be described later. As shown in FIG. 6, the second terminal 50 is a member located above and away from the first terminal 40 and extending in the vertical direction. The second terminal 50 includes an upper section 51, a lower section 52 and a constricted section 53. The second terminal 50 is made of metal (e.g. copper alloy) and the upper section 51, the lower section 52 and the constricted section 53 are integrally formed by press-working a plate material.

As shown in FIG. 1, the upper section 51 is a region provided outside the housing 70 and to be connected to the electrical circuit (not shown). The lower section 52 is a region extending downward from the upper section 51, and provided inside the housing 70. As shown in FIG. 6, the lower section 52 is located above the ceiling wall 21. The flexible conductor 60 is connected to a rear surface 52B of the lower section 52. A front surface 52A of the lower section 52 is facing the housing 70 (FIG. 1) across a tiny gap in the front-rear direction. The constricted section 53 is a region recessed laterally inwardly in a boundary region between the upper section 51 and the lower section 52, and provided in a later-described second opening Ap2 formed in the housing 70.

The flexible conductor 60 is a conductor having flexibility and electrically connects the first terminal 40 and the second terminal 50. In this embodiment, the flexible conductor 60 is a strip-like braided wire formed by braiding a plurality of metal strands (e.g. copper strands) having conductivity.

Note that the flexible conductor 60 is not particularly limited as long as the flexible conductor 60 is a conductor having flexibility. For example, the flexible conductor 60 may be a tubular braided wire or a coated wire formed by covering a conductive stranded wire by an insulator. Further, the flexible conductor 60 may be a laminated body (also called a laminated busbar or flexible busbar) formed by laminating a plurality of conductive flat plates (e.g. copper thin plates).

The flexible conductor 60 includes a first joined portion 61 connected to the first terminal 40, a second joined portion 62 connected to the second terminal 50 and a reformed portion 63 located between the first and second joined portions 61, 62.

More specifically, as shown in FIG. 6, the first joined portion 61 is connected to the rear surface 42B of the first terminal 40 with an end portion 60*a* of the flexible conductor 60 facing downward and the reformed portion 63 facing upward. Further, the second joined portion 62 is connected to the rear surface 52B of the second terminal 50 with an end portion 60*b* (end portion opposite to the end portion 60*a*) of the flexible conductor 60 facing upward and the reformed portion 63 facing downward. The first and second joined portions 61, 62 are respectively resistance-welded or crimped to the rear surface 42B and the rear surface 52B and have a higher rigidity than the reformed portion 63.

The second section 42 of the first terminal 40 and the lower section 52 of the second terminal 50 are overlapped in the front-rear direction while being separated in the vertical direction. The first and second joined portions 61, 62 are also overlapped in the front-rear direction while being separated in the vertical direction.

As shown in FIGS. 1 to 3, the reformed portion 63 is a part reformed to be contracted in the vertical direction when the connector 80 and the mating connector 90 are connected and the first terminal 40 moves upward. In this embodiment, the reformed portion 63 is reformed into a wavy shape (zigzag shape) as shown in FIG. 6. The reformed portion 63 includes a plurality of first apex portions 63*a* convex forward and a plurality of second apex portions 63*b* convex rearward. The first and second apex portions 63*a*, 63*b* are alternately located.

Figure 9:
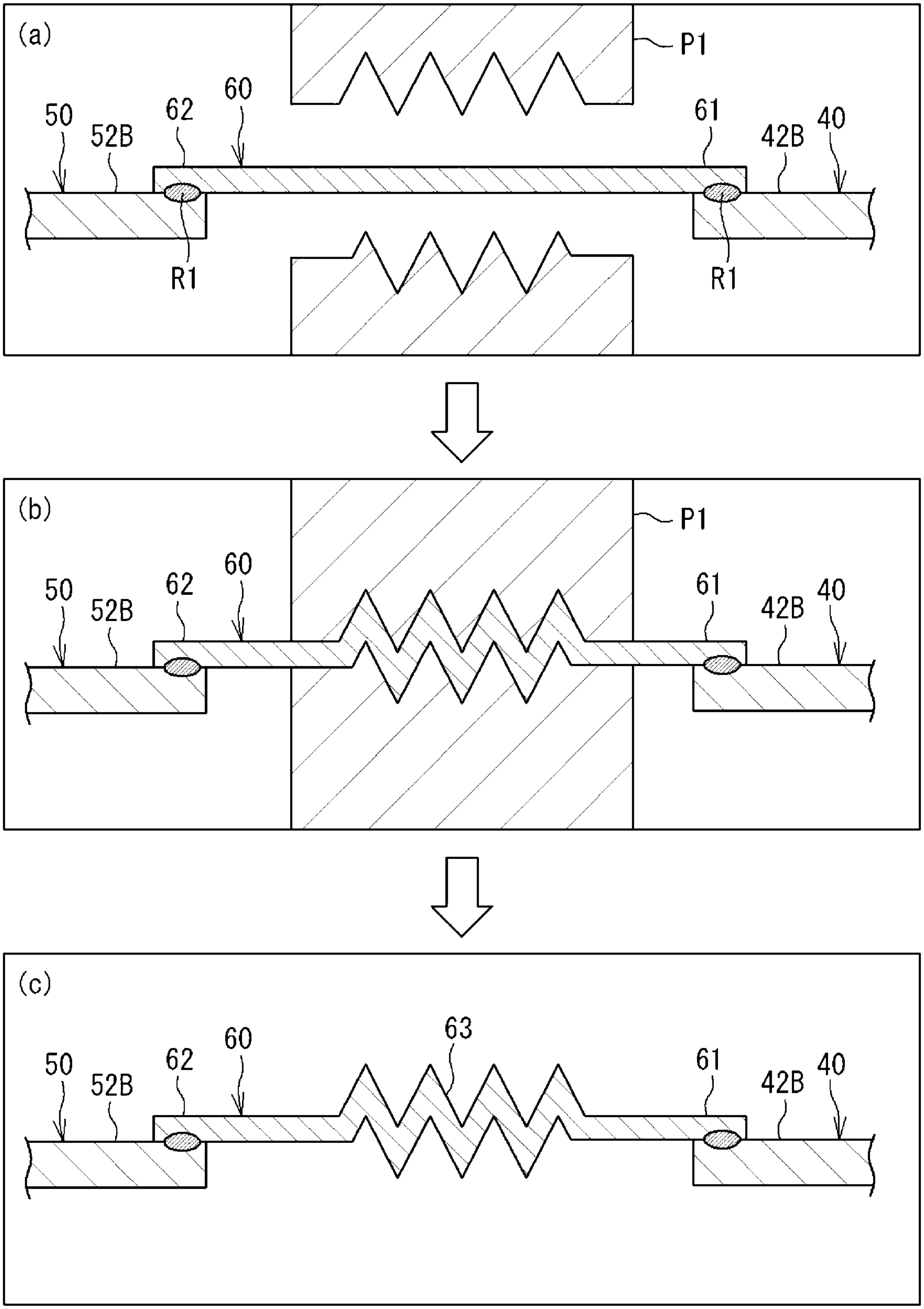
FIG. 9 is a diagram showing an example of a method for forming a reformed portion in a flexible conductor.

FIG. 9 is a diagram showing an example of a method for forming the reformed portion 63 of the flexible conductor 60. This method is a part of a manufacturing method of the terminal module 10. At first, as shown in (a) of FIG. 9, the flexible conductor 60 is resistance-welded or crimped to the first and second terminals 40, 50. In this way, the first and second joined portions 61, 62 are formed. Resistance-welded or crimped regions are shown as "regions R1". Subsequently, as shown in (b) of FIG. 9, a region of the flexible conductor 60 between the first and second joined portions 61, 62 is pressed by a press machine P1 and this region is reformed into a predetermined wavy shape by applying pressing and heating. In this way, the reformed portion 63 of the flexible conductor 60 is formed as shown in (c) of FIG. 9.

Reference is made to FIG. 1.

Here, in a state where no load is applied to the flexible conductor 60, a vertical length of the flexible conductor 60 is a natural length L1. In the unconnected state shown in FIG. 1, the vertical length of the flexible conductor 60 is a length L2 longer than the natural length L1. That is, in the unconnected state, the flexible conductor 60 is stretched by a predetermined length L3 (=L2−L1) in the vertical direction from the natural length L1. At this time, a restoring force F1 for contraction to the natural length L1 is generated in the flexible conductor 60, and the first terminal 40 is pulled upward by the restoring force F1 of the flexible conductor 60. The restoring force F1 can be expressed by following equation (1) using a spring constant K1 of the reformed portion 63 of the flexible conductor 60.

$$F1 = K1 \cdot L3 \qquad (1)$$

Here, in the unconnected state, the resilient member 30 is compressed by a predetermined length L4 from a natural length and the first terminal 40 is pressed downward by a restoring force F2 of the resilient member 30. The restoring force F2 can be expressed by following equation (2) using a spring constant K2 of the resilient member 30.

$$F2 = K2 \cdot L4 \qquad (2)$$

By setting the downward restoring force F2 of the resilient member 30 equal to or larger than the upward restoring force F1 of the flexible conductor 60 (F2 F1), the first terminal 40 can be held at a position shown in FIG. 1 (position where the lower surface 41B is in contact with a lower divided body 72 to be described later) even if the restoring force F1 is applied to the first terminal 40 in the unconnected state. Since the spring constant K2 of the resilient member 30 is sufficiently larger than the spring constant K1 of the reformed portion 63 (K2>K1) in this embodiment, the restoring force F2 is larger than the restoring force F1.

<<Configuration of Housing>>

Reference is made to FIG. 1. The housing 70 is a member made of resin for accommodating the terminal module 10. The housing 70 includes an upper divided body 71, the lower divided body 72 and a cover 73. The upper and lower divided bodies 71, 72 are members divided in the vertical direction. The housing 70 is configured by assembling the upper and lower divided bodies 71, 72 and assembling the cover 73. The upper divided body 71 is a casing open on a lower side and has an upper wall 71A, a front wall 71B and a rear wall 71C. The respective walls 71A to 71C of the upper divided body 71 are integrally formed, for example, by injection molding.

The upper wall 71A is a wall in contact with the ceiling wall 21 in the vertical direction, and provided along the front-rear direction and lateral direction. The front wall 71B is a wall in contact with the pair of side walls 22, 22 in the front-rear direction and extends downward from the front edge of the upper wall 71A. The lower end of the front wall 71B is located below the lower surface 41B of the first terminal 40. The rear wall 71C is a wall extending upward from the rear edge of the upper wall 71A. The rear wall 71C is facing the lower section 52 of the second terminal 50 in the front-rear direction. The upper end of the rear wall 71C is at the same position as the constricted section 53 of the second terminal 50 in the vertical direction.

The lower divided body 71 is a tubular body formed with a first opening Ap1 open in the vertical direction. The lower divided body 72 includes a tube portion 72A, a front wall 72B, a partition wall 72C and a rear wall 72D. The respective components of the lower divided body 72 are integrally formed, for example, by injection molding.

The tube portion 72A is a region in the form of a rectangular tube provided on a lower side of the lower divided body 72. The first opening Ap1 for allowing the entrance of the mating connector 90 from below is formed by the tube portion 72A. Inside dimensions of the tube portion 72A are set larger than outside dimensions of the later-described mating terminal 91 and fitting portion 94 included in the mating terminal 90, and the mating terminal 91 and the fitting portion 94 can enter the tube portion 72A.

The upper end of the tube portion 72A is in contact with the lower surface 41B of the first terminal 40. Thus, the terminal module 10 is held in the housing 70 while being vertically sandwiched by the upper wall 71A and the upper end of the tube portion 72A. The lower surface 41B of the first terminal 40 is exposed on a lower side of the connector 80 via the first opening Ap1. A width in the front-rear direction of the tube portion 72A is larger than that of the first terminal 40 and the rear end of the tube portion 72A is located behind the second section 42.

The front wall 72B is a wall extending upward after projecting forward from a vertically intermediate position of the tube portion 72A. The front wall 71B of the upper divided body 71 is in contact with a rear side of the front wall 72B, and the lower end of the front wall 71B is inserted in a gap formed by the front wall 72B and the tube portion 72A.

The partition wall 72C is a wall extending forward from the upper end of a rear side of the tube portion 72A. The partition wall 72C functions to partition a space into which the mating connector 90 enters (space in which the first opening Ap1 is located) and a space S1 in which the flexible conductor 60 is located at the time of connection of the mating connector 90.

The rear wall 72D is a wall extending upward after projecting rearward from a vertically intermediate position of the tube portion 72A. The cover 73 is in contact with a front side of the rear wall 72D, and the lower end of the cover 73 is inserted in a gap formed by the rear wall 72D and the tube portion 72A.

The cover 73 is a member located behind the first terminal 40, the second terminal 50 and the flexible conductor 60. The space S1 surrounded by the rear wall 71C, the partition wall 72C and the cover 73 is formed inside the housing 70. The flexible conductor 60 is accommodated in the space S1.

The second opening Ap2 open in the vertical direction is formed between the cover 73 and the rear wall 71C. The second terminal 50 is inserted into the housing 70 via the second opening Ap2. The constricted section 53 is located in the second opening Ap2 and the upper and lower sections 51, 52 sandwich the cover 73 located in the lateral direction of the second opening Ap2, whereby the second terminal 50 is fixed to the housing 70.

<<Configuration of Mating Connector>>

The mating connector 90 includes the mating terminal 91 and a mating housing 92. The mating terminal 91 is provided in the mating housing 92 by insert molding. The mating terminal 91 is a conductive member (e.g. copper alloy) and has an L shape including a region extending in the vertical direction and a region extending forward from the former region. The mating terminal 91 includes the mating contact points 93 to be brought into contact with the lower surface 41B of the first terminal 40. The mating contact points 93 are provided in the form of beads on the upper surface of the mating terminal 91 by plastically deforming parts of the mating terminal 91.

The mating housing 92 is a member made of resin. The mating housing 92 includes the fitting portion 94 insertable into the first opening Ap1 and a flange portion 95 extending in the front-rear direction and lateral direction. The fitting portion 94 has a shape convex upward and holds the mating terminal 91 on the upper surface thereof. The flange portion 95 is larger than the first opening Ap1 in the front-rear direction and lateral direction and suppresses the entrance of the mating connector 90 into the connector 80 beyond a specified position by coming into contact with the lower end of the tube portion 72A included in the housing 70 in a connected state shown in FIG. 3.

<<Connection of Connector and Mating Connector>>

With reference to FIGS. 1 to 3, a state of connecting the mating connector 90 to the connector 80 is described. If the mating connector 90 moves upward and approaches the connector 80 as shown in FIGS. 1 and 2, the mating terminal 91 and the fitting portion 94 of the mating connector 90 enter the housing 70 through the first opening Ap1. Then, the mating contact points 93 of the mating terminal 91 contact the lower surface 41B of the first terminal 40. Note that, in connecting the mating connector 90 to the connector 80, the connector 80 and the mating connector 90 only have to relatively approach each other in the vertical direction and the connector 80 may move downward and approach the mating connector 90.

If the mating connector 90 moves further upward after the mating contact points 93 contact the lower surface 41B, the first terminal 40 is pressed by the mating contact points 93, whereby the resilient member 30 moves upward while being compressed. At this time, the guided portions 44 (FIG. 6) of the first terminal 40 slide in contact with the guide surfaces 22B1 of the first leg portions 22B, whereby the first terminal 40 moves upward and also moves downward by the inclination of the guide surfaces 22B1 with respect to the front-rear direction as indicated by an arrow AR1 (see FIG. 2). Since the inclination widths in the front-rear direction of the first guide surfaces 22B1 are longer than the widths in the vertical direction thereof, an upward movement amount of the first terminal 40 at the time of connection is more than a rearward movement amount thereof.

The lower surface 41B of the first terminal 40 moving rearward slides in contact with the mating contact points 93 moving upward in the front-rear direction. In this way, foreign matters (e.g. films of sulfide, oxide and the like formed on the lower surface 41B) adhering between the lower surface 41B and the mating contact points 93 are removed.

If the mating connector 90 moves further upward as shown in FIG. 3, the mating connector 90 is connected to the connector 80. In this state, the first section 41 of the first terminal 40 is vertically sandwiched by the resilient member 30 and the mating contact points 93 while receiving a downward biasing force from the resilient member 30 and an upward pressing force from the mating contact points 93. By pressing the first section 41 against the mating contact points 93 by the resilient member 30 in this way, the first terminal 40 can be more reliably electrically connected to the mating contact points 93.

Functions and Effects of Embodiment

First, functions and effects achieved by providing the reformed portion 63 are described.

When the mating connector 90 is connected to the connector 80, the first terminal 40 moves upward to approach the second terminal 50 located away therefrom in the vertical direction. In association with this, the reformed portion 63 of the flexible conductor 60 is contracted and folded in the vertical direction. More specifically, the plurality of first apex portions 63*a* move forward while vertically approaching each other as shown in FIGS. 2 and 3. Further, the plurality of second apex portions 63*b* move rearward while vertically approaching each other.

Figure 10:
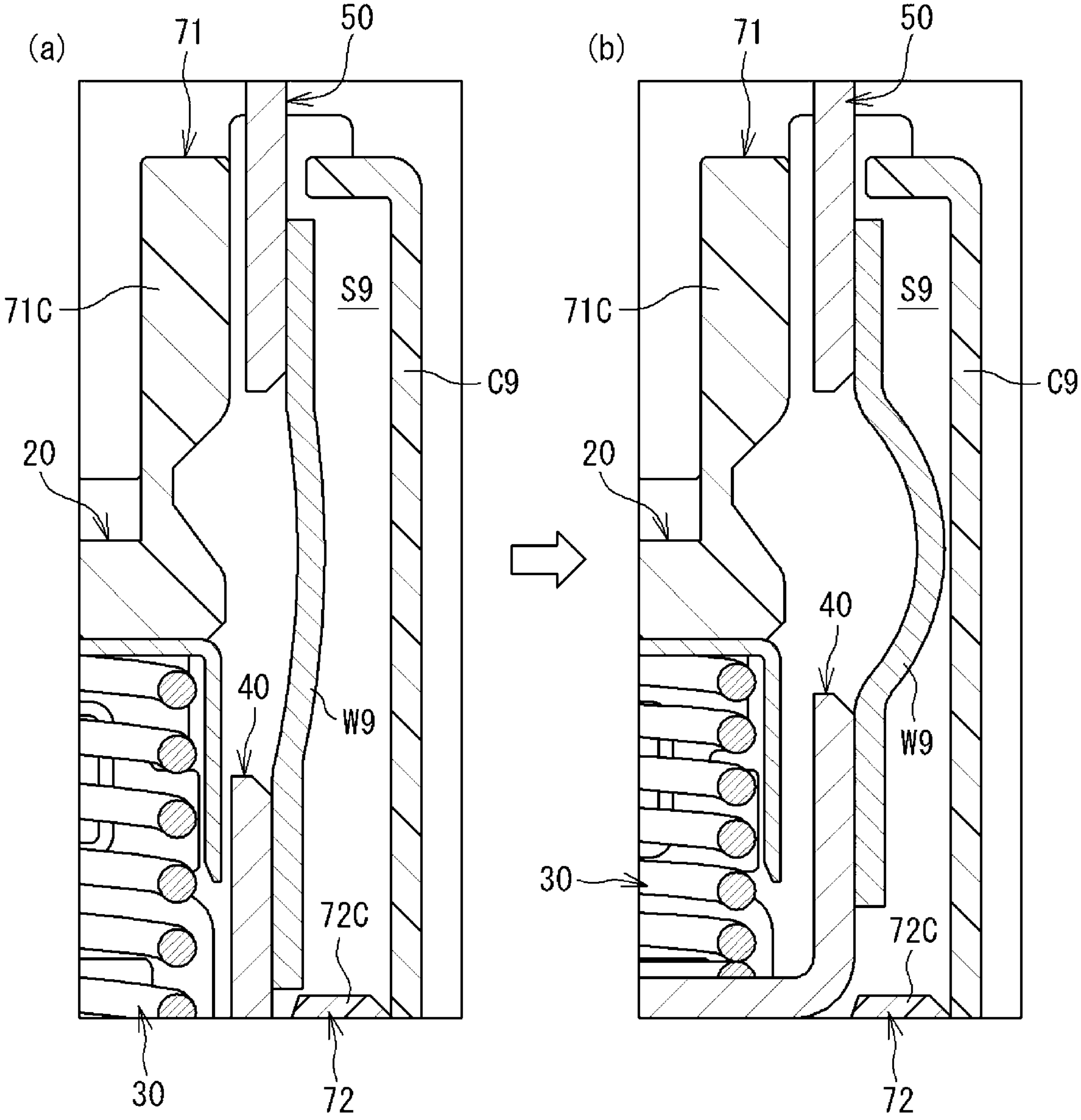
FIG. 10 is a diagram showing a comparative example of the embodiment.

FIG. 10 is a diagram showing a comparative example of this embodiment. In FIG. 10, the first terminal 40 and the second terminal 50 are electrically connected by a flexible conductor W9 (braided wire) not including the reformed portion 63 instead of the flexible conductor 60 of this embodiment. The flexible conductor W9 in the unconnected state is shown in (a) of FIG. 10, and the flexible conductor W9 in the connected state is shown in (b) of FIG. 10.

Since the flexible conductor W9 does not include the reformed portion 63, the flexible conductor W9 is deflected only rearward (toward a side away from the resilient member 30) when the mating connector 90 is connected. Thus, a cover C9 located more away from the flexible conductor W9 in the unconnected state in the front-rear direction is provided instead of the cover 73 to prevent the rubbing of a housing and the flexible conductor W9. A space S9 surrounded by the rear wall 71C of the upper divided body 71, the partition wall 72C of the lower divided body 72 and the cover C9 is wider in the front-rear direction.

In contrast, the flexible conductor 60 of this embodiment is deflected both forward and rearward and contracted in the vertical direction as shown in FIGS. 2 and 3 when the mating connector 90 is connected. Thus, a movable range in the front-rear direction of the flexible conductor 60 when the mating connector 90 is connected becomes smaller, and the space S1 provided for the movable range of the flexible conductor 60 can be made smaller. The space S1 is particularly smaller in the front-rear direction than the space S9. In this way, the connector 80 can be miniaturized while the breakage of the flexible conductor 60 is suppressed.

Further, since the reformed portion 63 is reformed, the deflection thereof is restricted as compared to the flexible conductor W9. Specifically, since the reformed portion 63 is easily deflected at the first and second apex portions 63*a*, 63*b*, the reformed portion 63 is deflected with the first and second apex portions 63*a*, 63*b* as starting points. That is, the predictability of the deflection of the reformed portion 63 is higher than that of the deflection of the flexible conductor W9. Thus, a margin provided in the space S1 to suppress the contact of the flexible conductor 60 and the housing 70 can be reduced and the connector 80 can be made smaller in size.

Next, functions and effects achieved by stretching the flexible conductor 60 in the unconnected state longer than the natural length L1 are described.

Figure 11:
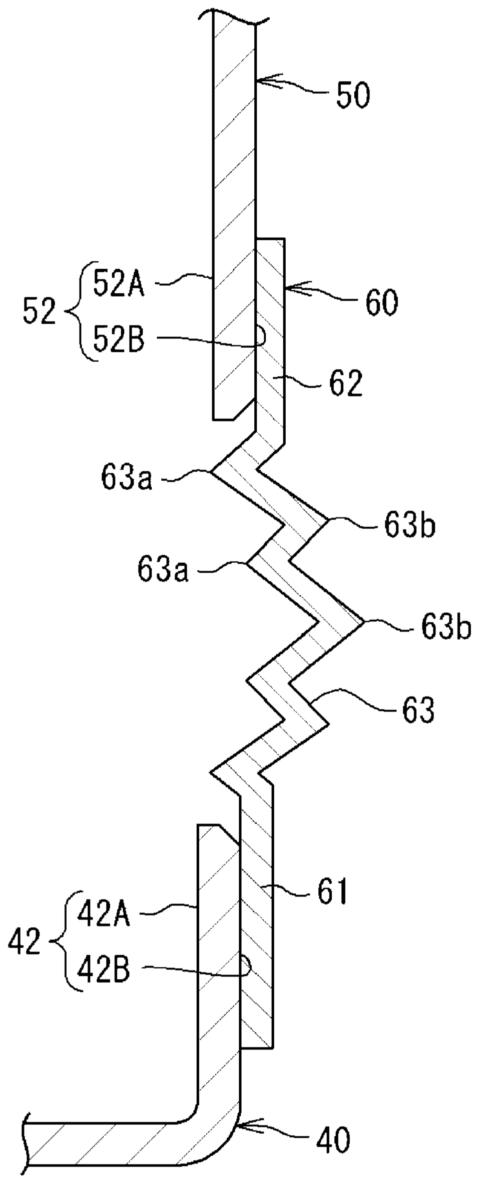
FIG. 11 is a diagram showing a state where the flexible conductor according to the embodiment is buckled in the connected state.

FIG. 11 is a diagram showing a buckled state of the flexible conductor 60 according to this embodiment in the connected state.

If the flexible conductor 60 is vertically contracted by the connection of the mating connector 90, the flexible conductor 60 may be buckled in the front-rear direction to escape a load applied to the flexible conductor 60 at the time of contraction in the front-rear direction. For example, as shown in FIG. 11, at least some of the first apex portions 63*a* may be deflected and deformed rearwardly of the front surface 42A of the second section 42 and the front surface 52A of the lower section 52. If the flexible conductor 60 is buckled in this way, the movable range in the front-rear direction of the flexible conductor 60 becomes larger than if no buckling occurs (see FIG. 3). Thus, the space S1 provided for the movable range of the flexible conductor 60 needs to be enlarged.

In contrast, in this embodiment, the vertical length L2 of the flexible conductor 60 in the unconnected state is longer than the vertical natural length L1 of the flexible conductor 60 by the predetermined length L3. The flexible conductor 60 stretched longer than the natural length L1 in the unconnected state is contracted and the length thereof approaches the natural length L1 by the connection of the mating connector 90. Thus, when the flexible conductor 60 is contracted, the restoring force F1 of the flexible conductor 60 is reduced, whereby a vertical load applied to the flexible conductor 60 is consumed. In this way, the buckling of the flexible conductor 60 in the front-rear direction at the time of contraction can be suppressed.

More specifically, in the connected state shown in FIG. 3, the vertical length of the flexible conductor 60 is a length L5 equal to or longer than the natural length L1 and shorter than the length L2. That is, in the connected state, the flexible conductor 60 is vertically stretched from the natural length L1 by a predetermined length L6 (=L5−L1). The predetermined length L6 is 0 or longer and shorter than the predetermined length L3. At this time, a restoring force F3 for contraction to the natural length L1 is generated in the flexible conductor 60, and the first terminal 40 is pulled upward by the restoring force F3 of the flexible conductor 60. Note that if the length L5 is equal to the natural length L1, the restoring force F3 is 0 and the flexible conductor 40 is not pulled either upward or downward. The restoring force F3 can be expressed by following equation (3).

$$F3=K1\cdot L6 \quad (3)$$

Since the predetermined length L6 is shorter than the predetermined length L3, the restoring force F3 of the flexible conductor 60 in the connected state is smaller than the restoring force F1 of the flexible conductor 60 in the unconnected state (F3<F1). Since a vertical load applied to the flexible conductor 60 when the flexible conductor 60 is contracted can be absorbed by this restoring force difference (F1−F3), the buckling of the flexible conductor 60 due to an overload can be suppressed.

Note that the length L5 of the flexible conductor 60 in the connected state may be shorter than the natural length L1. In this case, the flexible conductor 60 in the connected state is contracted by a predetermined length L7 (L7=L1−L5) in the vertical direction from the natural length L1 and a restoring force F4 (=K1·L7) for stretching to the natural length L1 is generated in the flexible conductor 60. A direction of the restoring force F4 is opposite to those of the restoring forces F1, F3. Also in this case, since a vertical load applied to the flexible conductor 60 at the time of contracting the flexible conductor 60 can be absorbed by the restoring force F1, the buckling of the flexible conductor 60 due to an overload can be suppressed.

Modification

A modification of the embodiment is described below. In the modification, components remaining unchanged from the embodiment are denoted by the same reference signs and not described.

<<Modification of Reformed Portion>>

Figure 12:
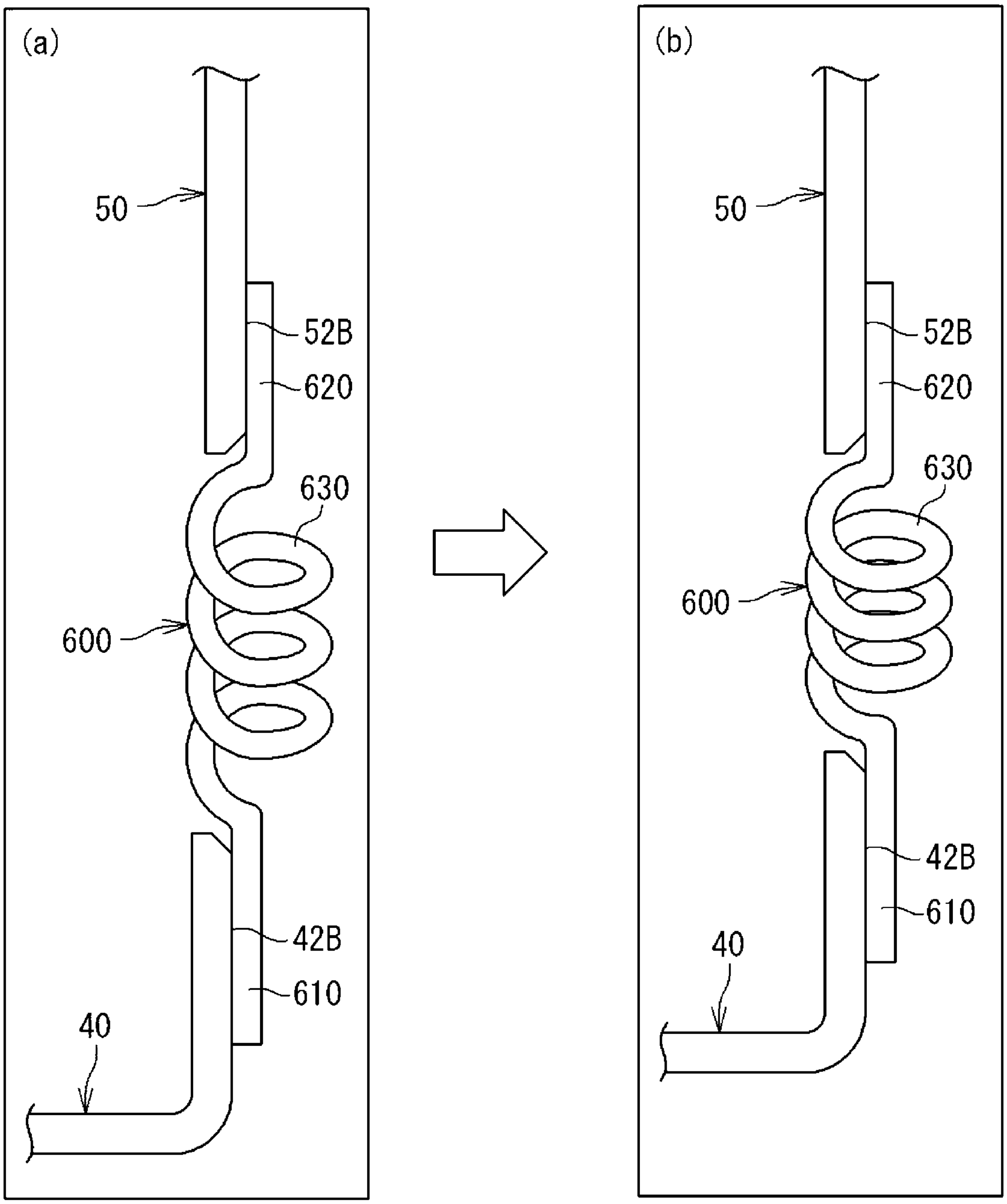
FIG. 12 is a diagram showing a flexible conductor according to a modification.

FIG. 12 is a diagram showing a flexible conductor 600 according to the modification. The flexible conductor 600 in the unconnected state is shown in (a) of FIG. 12, and the flexible conductor 600 in the connected state is shown in (b) of FIG. 12. In the above embodiment, the reformed portion 63 has a wavy shape. However, a reformed portion may have a shape other than the wavy shape.

The flexible conductor 600 is a conductor having flexibility and electrically connects the first terminal 40 and the second terminal 50. In this modification, the flexible conductor 600 may be a braided wire or coated wire. Further, the flexible conductor 600 may be a single wire (e.g. made of copper alloy) having conductivity.

The flexible conductor 600 includes a first joined portion 610 to be resistance-welded or crimped to the rear surface 42B of the first terminal 40, a second joined portion 620 to be resistance-welded or crimped to the rear surface 52B of the second terminal 50 and a reformed portion 630 located between the first and second joined portions 610, 620. The reformed portion 630 is reformed into a spiral shape as shown in FIG. 12. The reformed portion 630 is reformed, for example, by heating the flexible conductor 600 wound on a rod.

Since the reformed portion 630 has a spiral shape, the reformed portion 630 is vertically contracted when the first terminal 40 moves upward. In this way, as in the above embodiment, a movable range of the flexible conductor 600 at the time of connection can be reduced, and the connector 80 can be miniaturized while the breakage of the flexible conductor 600 is suppressed.

By forming the reformed portion into a wavy or spiral shape as in the above embodiment or modification, the reformed portion can be relatively easily formed.

<<Miscellaneous>>

In the above embodiment, the flexible conductor 60 is connected to the rear surface 42B of the first terminal 40 and the rear surface 52B of the second terminal 50. However, the flexible conductor 60 may be connected to the front surface 42A of the first terminal 40 and the front surface 52A of the second terminal 50.

In the above embodiment, the first terminal 40 moves obliquely to the upper rear side when the mating connector 90 is connected. However, a rearward movement of the first terminal 40 at the time of connection is not essential and the first terminal 40 may move only upward. In this case, the guide surfaces 22B1 of the first leg portions 22B are shaped to extend straight downward and the guided portions 44 are guided only in the vertical direction.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A terminal module to be electrically connected to a mating connector by being fit to the mating connector relatively approaching along a first direction from one side to another side, comprising:

- a case having a ceiling wall and a pair of side walls extending toward the one side from the ceiling wall;
- a resilient member to be accommodated into the case, the resilient member being stretchable along the first direction;
- a first terminal to be supported on the pair of side walls while being biased toward the one side by the resilient member, the first terminal being movable toward the another side by being pressed by the mating connector;

a second terminal located away from the first terminal toward the another side, the second terminal extending in the first direction; and a flexible conductor for electrically connecting the first terminal and the second terminal, wherein the flexible conductor includes a reformed portion that is reformed to be contracted in the first direction when the first terminal moves toward the another side, and in an unconnected state before the terminal module is fit to the mating connector, a resilient force toward the another side generated in the flexible conductor is smaller than a resilient force toward the one side generated in the resilient member.

2. The terminal module of claim 1, wherein the reformed portion is reformed to be deflected toward both sides in a second direction orthogonal to the first direction when the first terminal moves toward the another side.

3. The terminal module of claim 1, wherein the reformed portion is reformed into a wavy or spiral shape.

4. The terminal module of claim 1, wherein the flexible conductor is a braided wire, a coated wire formed by covering a conductive stranded wire by an insulator, a laminated body formed by laminating a plurality of conductive flat plates or a conductive single wire.

5. The terminal module of claim 1, wherein a length of the flexible conductor in the first direction in the unconnected state, is longer than a natural length of the flexible conductor in the first direction in a state where no load is applied to the flexible conductor.

6. The terminal module of claim 5, wherein:

a length of the resilient member in the first direction in the unconnected state is shorter than a natural length of the resilient member in the first direction in a state where no load is applied to the resilient member.

7. A connector, comprising:

the terminal module of claim 1; and a housing for accommodating the terminal module.

8. The terminal module of claim 1, wherein the reformed portion includes a plurality of first apex portions convex forward and a plurality of second apex portions convex rearward, and the first and second apex portions are alternately located.

9. The terminal module of claim 1, wherein a spring constant of the resilient member is larger than a spring constant of the reformed portion.

* * * * *